United States Patent
Zhang et al.

(10) Patent No.: US 10,306,007 B2
(45) Date of Patent: May 28, 2019

(54) CACHE CONTENT HIT METHOD AND COMMUNICATIONS SYSTEM

(71) Applicant: Huawei Software Technologies Co., Ltd., Nanjing (CN)

(72) Inventors: Shaolin Zhang, Shenzhen (CN); Xiongjun Shi, Nanjing (CN)

(73) Assignee: Huawei Software Technologies, Co., Ltd., Nanjing (CN)

( * ) Notice: Subject to any disclaimer, the term of this patent is extended or adjusted under 35 U.S.C. 154(b) by 289 days.

(21) Appl. No.: 15/430,055

(22) Filed: Feb. 10, 2017

(65) Prior Publication Data

US 2017/0155734 A1 Jun. 1, 2017

Related U.S. Application Data

(63) Continuation of application No. PCT/CN2015/076774, filed on Apr. 16, 2015.

(30) Foreign Application Priority Data

Aug. 12, 2014 (CN) .......................... 2014 1 0394832

(51) Int. Cl.
*G06F 15/16* (2006.01)
*H04L 29/08* (2006.01)
(Continued)

(52) U.S. Cl.
CPC ......... *H04L 67/2847* (2013.01); *G06Q 30/04* (2013.01); *H04L 12/14* (2013.01); *H04L 29/08* (2013.01); *H04L 67/2842* (2013.01)

(58) Field of Classification Search
CPC . H04L 67/2847; H04L 12/14; H04L 67/2842; H04L 29/08; G06Q 30/04
(Continued)

(56) References Cited

U.S. PATENT DOCUMENTS

| 6,553,409 | B1 * | 4/2003 | Zhang | ................. G06F 12/0815 709/213 |
| 2003/0018891 | A1 * | 1/2003 | Hall | .................... H04L 63/0428 713/160 |

(Continued)

FOREIGN PATENT DOCUMENTS

CN 101616392 A 12/2009
CN 103166978 A 6/2013
(Continued)

*Primary Examiner* — Krisna Lim
(74) *Attorney, Agent, or Firm* — James Anderson Harrison

(57) ABSTRACT

Embodiments of the present invention include a cache content hit method to ensure that a charging and interception apparatus performs interception and charging on content accessed by a user. The method in the embodiments of the present invention includes: receiving a content request message that carries a content identifier; searching local cache content for content corresponding to the content identifier; and when it is determined that the content corresponding to the content identifier is stored, sending the content to the access network device; forwarding, by the edge cache apparatus to a core cache apparatus after adding a content hit identifier to the content request message, a content request message to which the content hit identifier is added to making the cache control apparatus discarding the content in the response message according to the content hit identifier.

12 Claims, 4 Drawing Sheets

(51) Int. Cl.
*H04L 12/14* (2006.01)
*G06Q 30/04* (2012.01)

(58) Field of Classification Search
USPC .......................................................... 709/217
See application file for complete search history.

(56) References Cited

U.S. PATENT DOCUMENTS

| | | | |
|---|---|---|---|
| 2010/0325357 A1* | 12/2010 | Reddy | G06F 21/53 |
| | | | 711/118 |
| 2012/0102141 A1 | 4/2012 | Burckart et al. | |
| 2013/0144994 A1* | 6/2013 | Li | G06F 17/30864 |
| | | | 709/220 |
| 2013/0326133 A1* | 12/2013 | Lee | G06F 17/30982 |
| | | | 711/108 |
| 2014/0043980 A1 | 2/2014 | Anthony, Jr. et al. | |
| 2014/0126474 A1* | 5/2014 | Eriksson | H04L 29/08729 |
| | | | 370/328 |
| 2015/0350367 A1* | 12/2015 | Graham | H04L 67/2842 |
| | | | 709/213 |

FOREIGN PATENT DOCUMENTS

| | | |
|---|---|---|
| CN | 103168482 A | 6/2013 |
| CN | 104168317 A | 11/2014 |
| EP | 3016356 A1 | 5/2016 |
| EP | 2434684 B1 | 1/2017 |

* cited by examiner

CACHE CONTENT HIT METHOD AND COMMUNICATIONS SYSTEM

CROSS-REFERENCE TO RELATED APPLICATIONS

This application is a continuation of International Application No. PCT/CN2015/076774, filed on Apr. 16, 2015, which claims priority to Chinese Patent Application No. 201410394832.6, filed on Aug. 12, 2014, both of which are hereby incorporated by reference in their entireties.

TECHNICAL FIELD

The present invention relates to the field of mobile communications, and in particular, to a cache content hit method and a communications system.

BACKGROUND

In an existing network architecture, a charging and interception apparatus is disposed between the Internet and a radio access network. Content to be accessed by a user is sent from the Internet to the charging and interception apparatus, is sent by the charging and interception apparatus to the radio access network, and then is sent to the user. In this way, it can be ensured that the charging and interception apparatus can monitor Internet content accessed by the user, so as to perform charging according to the content.

In order to improve access experience of the user and reduce network device investments caused by repeated content transmission, generally, an Internet cache apparatus is disposed between the charging and interception apparatus and the Internet, and is used to cache Internet content repeatedly accessed by the user. When the Internet cache apparatus stores Internet content to be accessed by the user, the Internet cache apparatus sends the content to the charging and interception apparatus, and then the charging and interception apparatus sends the content to the radio access network. In this way, it is not required to repeatedly make a request to the Internet for same content, so as to shorten a content access delay.

Further, in order to reduce backhaul line transmission bandwidth between the radio access network and the charging and interception apparatus, a general solution is to deploy a radio access network cache on a base station side, so as to cache repeated content accessed by the user. If the content accessed by the user is stored in the radio access network cache, the radio access network directly feeds back the content to the user; and if the content accessed by the user is not stored in the radio access network cache, the radio access network makes a request to the Internet cache apparatus again.

However, because the repeated content is directly returned by the radio access network cache to the user when being accessed by the user, without passing through the charging and interception apparatus, incorrect charging is performed by the charging and interception apparatus on traffic of the user, which affects a traffic revenue of an operator and skips lawful interception on the part of content.

SUMMARY

Embodiments of the present invention provide a cache content hit method and a communications system, which can reduce backhaul line transmission bandwidth between a radio access network and a charging and interception apparatus while ensuring that the charging and interception apparatus performs interception and charging on content accessed by a user.

A first aspect of the embodiments of the present invention provides a cache content hit method, including:

receiving and storing, by an edge cache apparatus, a content request message from an access network device, where the content request message carries a content identifier;

searching, by the edge cache apparatus, local cache content for content corresponding to the content identifier;

when determining that the edge cache apparatus stores the content corresponding to the content identifier, sending the content corresponding to the content identifier to the access network device; and forwarding, by the edge cache apparatus to a core cache apparatus after adding a content hit identifier to the content request message, a content request message to which the content hit identifier is added;

sending, by the core cache apparatus to a cache control apparatus by using a charging and interception apparatus, a response message that carries the content corresponding to the content identifier, where the response message carries the content hit identifier; and discarding, by the cache control apparatus, the content in the response message according to the content hit identifier.

With reference to the first aspect of the embodiments of the present invention, in a first implementation manner of the first aspect of the embodiments of the present invention, the determining that the edge cache apparatus stores the content corresponding to the content identifier includes:

searching, by the edge cache apparatus according to the content identifier, the local cache content for the content corresponding to the content identifier; and when the edge cache apparatus stores the content identifier, determining that the edge cache apparatus stores the content corresponding to the content identifier.

With reference to the first aspect of the embodiments of the present invention, in a second implementation manner of the first aspect of the embodiments of the present invention, the determining that the edge cache apparatus stores the content corresponding to the content identifier includes:

forwarding, by the edge cache apparatus, the content request message to the core cache apparatus;

acquiring, by the core cache apparatus according to the content identifier, the content corresponding to the content identifier;

calculating, by the core cache apparatus, a hash (Hash) identifier of the content, and sending, by successively using the charging and interception apparatus and the cache control apparatus, a response message that includes the hash identifier to the edge cache apparatus;

searching, by the edge cache apparatus according to the hash identifier, the local cache content for the content corresponding to the hash identifier; and when the edge cache apparatus stores the hash identifier, determining that the edge cache apparatus stores the content corresponding to the content identifier.

With reference to the first aspect of the embodiments of the present invention, in a third implementation manner of the first aspect of the embodiments of the present invention, the method further includes:

sending, by the edge cache apparatus after acquiring the content from the core cache apparatus, the content to the access network device when the edge cache apparatus does not store the content corresponding to the content identifier.

With reference to the third implementation manner of the first aspect of the embodiments of the present invention, in a fourth implementation manner of the first aspect of the embodiments of the present invention, the sending, by the edge cache apparatus after acquiring the content from the core cache apparatus, the content to the access network device when the edge cache apparatus does not store the content corresponding to the content identifier includes:

when the edge cache apparatus does not store the content corresponding to the content identifier, forwarding, by the edge cache apparatus to the core cache apparatus after adding a content miss identifier to the content request message, a content request message to which the content miss identifier is added;

sending, by the core cache apparatus to the cache control apparatus by using the charging and interception apparatus, a response message that carries the content corresponding to the content identifier, where the response message carries the content miss identifier; and sending, by the cache control apparatus, the content to the access network device by using the edge cache apparatus and according to the content miss identifier.

With reference to the third implementation manner of the first aspect of the embodiments of the present invention, in a fifth implementation manner of the first aspect of the embodiments of the present invention, the responding, by the edge cache apparatus after acquiring the content from the core cache apparatus, the content to the access network device when the edge cache apparatus does not store the content corresponding to the content identifier includes:

when the edge cache apparatus does not store the content corresponding to the content identifier, forwarding, by the edge cache apparatus, the content request message to the core cache apparatus;

sending, by the core cache apparatus to the cache control apparatus by using the charging and interception apparatus, a response message that carries the content corresponding to the content identifier; and sending, by the cache control apparatus, the response message to the access network device by using the edge cache apparatus.

A second aspect of the embodiments of the present invention provides a communications system, including:

an access network device, an edge cache apparatus, a cache control apparatus, a charging and interception apparatus, and a core cache apparatus, where:

the edge cache apparatus is configured to receive and store a content request message from the access network device, where the content request message carries a content identifier;

the edge cache apparatus is further configured to search local cache content for content corresponding to the content identifier;

the edge cache apparatus is further configured to: when determining that the edge cache apparatus stores the content corresponding to the content identifier, send the content corresponding to the content identifier to the access network device; and after adding a content hit identifier to the content request message, forward, to the core cache apparatus, a content request message to which the content hit identifier is added;

the core cache apparatus is configured to send, to the cache control apparatus by using the charging and interception apparatus, a response message that carries the content corresponding to the content identifier, where the response message carries the content hit identifier; and the cache control apparatus is configured to discard the content in the response message according to the content hit identifier.

With reference to the second aspect of the embodiments of the present invention, in a first implementation manner of the second aspect of the embodiments of the present invention, the edge cache apparatus is specifically configured to search, according to the content identifier, the local cache content for the content corresponding to the content identifier; and when the edge cache apparatus stores the content identifier, determine that the edge cache apparatus stores the content corresponding to the content identifier.

With reference to the second aspect of the embodiments of the present invention, in a second implementation manner of the second aspect of the embodiments of the present invention, the edge cache apparatus is further configured to forward the content request message to the core cache apparatus;

the core cache apparatus is further configured to acquire, according to the content identifier, the content corresponding to the content identifier;

the core cache apparatus is further configured to calculate a hash (Hash) identifier of the content, and send, by successively using the charging and interception apparatus and the cache control apparatus, a response message that includes the hash identifier to the edge cache apparatus;

the edge cache apparatus is further configured to search the local cache content for the hash identifier according to the hash identifier; and the edge cache apparatus is further configured to: when the edge cache apparatus stores the hash identifier, determine that the edge cache apparatus stores the content corresponding to the content identifier.

With reference to the second aspect of the embodiments of the present invention, in a third implementation manner of the second aspect of the embodiments of the present invention, the edge cache apparatus is further configured to send, after acquiring the content from the core cache apparatus, the content to the access network device when the edge cache apparatus does not store the content corresponding to the content identifier.

With reference to the third implementation manner of the second aspect of the embodiments of the present invention, in a fourth implementation manner of the second aspect of the embodiments of the present invention, the edge cache apparatus is specifically configured to: when the edge cache apparatus does not store the content corresponding to the content identifier, after adding a content miss identifier to the content request message, forward, to the core cache apparatus, a content request message to which the content miss identifier is added;

the core cache apparatus is further configured to send, to the cache control apparatus by using the charging and interception apparatus, a response message that carries the content corresponding to the content identifier, where the response message carries the content miss identifier; and the cache control apparatus is further configured to send the content to the access network device by using the edge cache apparatus and according to the content miss identifier.

With reference to the third implementation manner of the second aspect of the embodiments of the present invention, in a fifth implementation manner of the second aspect of the embodiments of the present invention, the edge cache apparatus is specifically configured to: when the edge cache apparatus does not store the content corresponding to the content identifier, forward the content request message to the core cache apparatus;

the core cache apparatus is specifically configured to send, to the cache control apparatus by using the charging and interception apparatus, a response message that carries the content corresponding to the content identifier; and the cache control apparatus is specifically configured to send the response message to the access network device by using the edge cache apparatus.

It can be learned from the foregoing technical solutions that the embodiments of the present invention have the following advantages:

In at least one embodiment of the present invention, when an edge cache apparatus locally stores content corresponding to a content identifier, the edge cache apparatus sends the content corresponding to the content identifier to an access network device; and after adding a content hit identifier to a content request message, further forwards, to a core cache apparatus, a content request message to which the content hit identifier is added. In this way, the core cache apparatus may send, to a cache control apparatus by using a charging and interception apparatus, a response message that carries the content corresponding to the content identifier, so that the charging and interception apparatus can perform interception and charging for the content corresponding to the content identifier. In addition, the edge cache apparatus produces at least part of the related content to a user, and subsequently may discard the content in the response message that corresponds to the content hit identifier carried in the response message. This avoids repeated sending of the content to the user. Accordingly, the charging and interception apparatus may not need to discard the content, but the cache control apparatus is added to a communications system to perform the action, which can greatly reduce transformation for an existing apparatus and reduce transformation costs.

DESCRIPTION OF EMBODIMENTS

Embodiments of the present invention provide a cache content hit identification method and a communications system, which can reduce backhaul line transmission bandwidth between a radio access network and a charging and interception apparatus to support correct charging and billing for content accessed by a user.

Various embodiments of the present invention are described with reference to the accompanying drawings. The scope of the described embodiments are not limited to the specific embodiments described herein. All other embodiments that can be derived by persons of ordinary skill in the art based on the descriptions of embodiments of the present invention without creative efforts shall fall within the scope of the present invention.

In the specification, claims, and accompanying drawings of the present invention, the terms "include" and "have" and any variations thereof, are intended to cover a non-exclusive inclusion. For example, a process, a method, a system, a product, or a device that includes a series of steps or units, is not necessarily limited to expressly listed steps or units, but may include other units that are not expressly listed or that are inherent to such process, method, system, product, or device.

Figure 4:
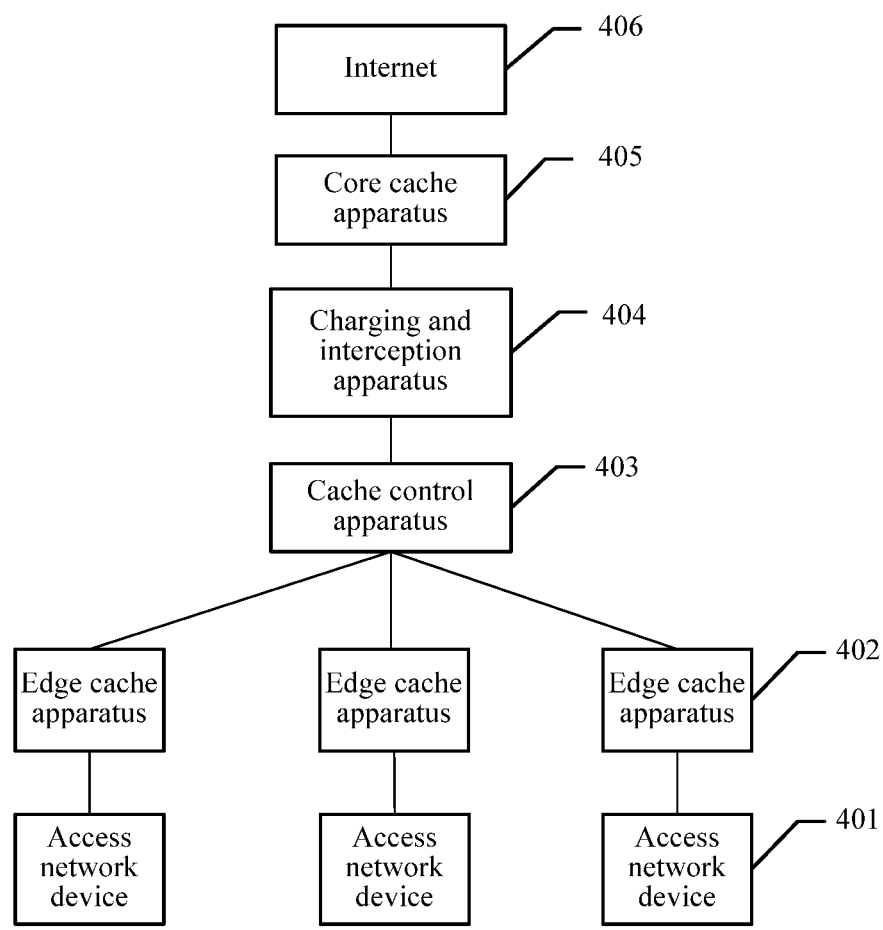
FIG. 4 is a networking diagram of a communications system according to the present invention.

For ease of understanding the embodiments of the present invention, the following briefly describes an architecture of a communications system of the present invention. Referring to FIG. 4, FIG. 4 is an architectural diagram of a communications system of the present invention. A communications system 400 includes an access network device 401, an edge cache apparatus 402, a cache control apparatus 403, a charging and interception apparatus 404, and a core cache apparatus 405. In practical application, the access network device 401 may be a base station, a radio network controller (Radio Network Controller, RNC), another access network device, or the like, and is configured to forward a request message from a user terminal to a backbone network. The edge cache apparatus 402 may be an RAN Cache Edge, and the core cache apparatus 405 may be a Core Cache. The two are cache devices and are configured to cache Internet content. The cache control apparatus 403 may be a routing and forwarding device and is configured to determine whether to forward a message of the charging and interception apparatus 404 to the edge cache apparatus 402. The charging and interception apparatus 404 may be a PCEF device and a GGSN device, a PGW device and an SGW device, or the like, and is configured to perform charging and lawful interception on content requested by the user terminal.

When the user terminal requests response content from the Internet 406, a content request message from the user terminal is first sent to the access network device, and then is forwarded by the access network device to the edge cache apparatus. If the edge cache apparatus stores content requested by the content request message, the edge cache apparatus directly responds the content to the access network device, and then the access network device forwards the content to the user terminal. If the edge cache apparatus does not store the content requested by the content request message, the edge cache apparatus forwards the content request message to the core cache apparatus.

If the core cache apparatus stores the content requested by the content request message, the core cache apparatus sends the content to the charging and interception apparatus; and if the core cache apparatus does not store the content, the core cache apparatus sends the content request message to the Internet, receives a content response from the Internet, and then sends the content to the charging and interception apparatus. The charging and interception apparatus forwards the content to the edge cache apparatus. The edge cache apparatus stores the content and forwards the content to the access network device, and the access network device forwards the content to the user terminal.

Figure 1:
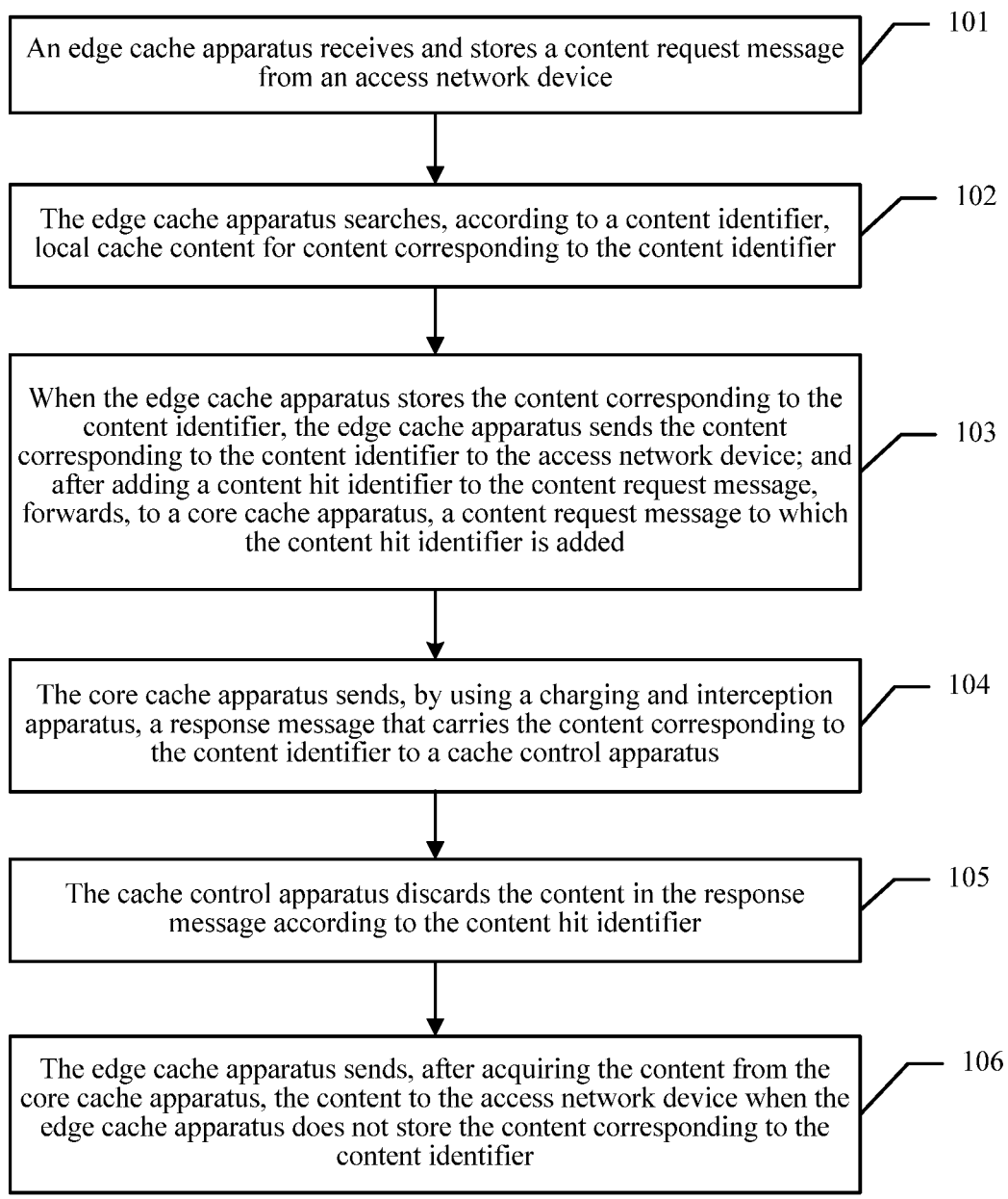
FIG. 1 is a flowchart of an embodiment of a cache content hit method according to the present invention.

The following describes a cache content hit method of at least one embodiment of the present invention in detail. Referring to FIG. 1, a cache content hit method in an embodiment of the present embodiment of invention includes:

101. An edge cache apparatus receives and stores a content request message from an access network device.

In this embodiment, the access network device may be a base station (such as a NodeB), a radio network controller (Radio Network Controller, RNC), or another access network device, where the base station may be a base station in a 2G wireless communications system, a 3G wireless communications system, an LTE wireless communications system, or another communications system, and is not limited herein.

The access network device receives the content request message, where the content request message carries a content identifier. Specifically, for example, the content request message may be an Http request, such as a URL (Uniform Resource Locator, uniform resource locator). Certainly, in practical application, the content request message may be of another type and is not limited herein.

102. The edge cache apparatus searches local cache content for content corresponding to the content identifier.

Because the content corresponding to the content identifier is relatively large, generally, the edge cache apparatus does not directly determine, by means of searching, whether the local cache content stores the content, but searches for, in another manner, the content corresponding to the content identifier. For example, the edge cache apparatus stores content identifiers in some previously received content request messages, and content corresponding to the content identifiers, where the content identifiers and the corresponding content are associated in the local cache content. Each time the edge cache apparatus receives a content request message from the access network device, the edge cache apparatus searches the local cache content for a content identifier according to the content identifier in the content request message, that is, the edge cache apparatus determines, by searching whether the edge cache apparatus stores the content identifier, whether the edge cache apparatus stores the content.

Certainly, in practical application, the edge cache apparatus may also search, by using another method, the local cache content for the content corresponding to the content identifier, which is not limited herein.

103. When determining that the edge cache apparatus stores the content corresponding to the content identifier, the edge cache apparatus sends the content corresponding to the content identifier to the access network device; and after adding a content hit identifier to the content request message, forwards, to a core cache apparatus, a content request message to which the content hit identifier is added.

In a case in which the edge cache apparatus searches for, according to a content identifier, content corresponding to the content identifier, when the edge cache apparatus stores the content identifier, the edge cache apparatus determines that the edge cache apparatus stores the content corresponding to the content identifier. Certainly, in a case in which the content corresponding to the content identifier is searched for by using another method, it is determined, according to another corresponding method, that the edge cache apparatus stores the content.

The edge cache apparatus sends the content corresponding to the content identifier to the access network device, so that the access network device can feed back the related content to a user terminal. In this way, because content requested by the access network device can be directly fed back by the edge cache apparatus, backhaul line transmission bandwidth between a radio access network and a charging and interception apparatus can be reduced, and a delay for accessing the content by a user is greatly shortened. Preferably, the edge cache apparatus is deployed on a base station side, which can further shorten the delay for accessing the content by the user.

In addition, the edge cache apparatus further adds the content hit identifier to the content request message, so as to indicate that the edge cache apparatus has hit the content requested by the content request message and sent the content to the access network device. There are multiple methods for adding the content hit identifier. Specifically, for example, a TOS field in an IP header of the content request message may be used as the identifier. After the content request message is hit, the edge cache apparatus sets one bit in the TOS field to 1, which is used as the content hit identifier. Certainly, in practical application, the content hit identifier may also be added by using another method, which is not limited herein.

After adding the content hit identifier to the content request message, the edge cache apparatus forwards, to the core cache apparatus, the content request message to which the content hit identifier is added.

104. The core cache apparatus sends, to a cache control apparatus by using a charging and interception apparatus, a response message that carries the content corresponding to the content identifier.

After receiving the content request message, the core cache apparatus first searches local cache content for the content identifier, so as to determine whether the core cache apparatus stores the content corresponding to the content identifier.

If the core cache apparatus stores the content corresponding to the content identifier, the core cache apparatus sends, to the cache control apparatus, the response message that carries the content corresponding to the content identifier, where the response message further carries the content hit identifier; and when being sent to the cache control apparatus, the response message passes through the charging and interception apparatus.

If the core cache apparatus does not store the content corresponding to the content identifier, the core cache apparatus forwards the content request message to the Internet, so as to request the Internet to feed back the content corresponding to the content identifier in the content request message. After the core cache apparatus receives a feedback from the Internet, the core cache apparatus stores the content identifier in the content request message and the content corresponding to the content identifier, and further sends, to the cache control apparatus by using the charging and interception apparatus, the response message that carries the content corresponding to the content identifier, where the response message further carries the content hit identifier.

When receiving the response message from the core cache apparatus, the charging and interception apparatus performs interception and charging on the content that is corresponding to the content identifier and carried in the response message.

105. The cache control apparatus discards the content in the response message according to the content hit identifier.

When the response message received by the cache control apparatus carries the content hit identifier, it indicates that the edge cache apparatus has sent the content corresponding to the content identifier in the content request message to the access network device. Therefore, in order to avoid that the access network device repeatedly receives the content corresponding to the content identifier in the content request message, the cache control apparatus discards the content in the response message according to the content hit identifier.

In this embodiment, when an edge cache apparatus locally stores content corresponding to a content identifier, the edge cache apparatus sends the content corresponding to the content identifier to an access network device; and after adding a content hit identifier to a content request message, further forwards, to a core cache apparatus, a content request message to which the content hit identifier is added. In this way, the core cache apparatus may send, to a cache control apparatus by using a charging and interception apparatus, a response message that carries the content corresponding to the content identifier, so that the charging and interception apparatus can perform interception and charging on the content corresponding to the content identifier. In addition, the edge cache apparatus has fed back the part of related content to a user, and therefore, the cache control apparatus may discard the content in the response message according to the content hit identifier carried in the response message, which avoids repeatedly sending the content to the user. Moreover, in this case, the charging and interception apparatus may not need to discard the content, but the cache control apparatus is added to a communications system to perform the action, which can greatly reduce transformation for an existing apparatus and reduce transformation costs.

Preferably, the cache content hit method in the present invention further includes:

106. The edge cache apparatus sends, after acquiring the content from the core cache apparatus, the content to the access network device when the edge cache apparatus does not store the content corresponding to the content identifier.

Specifically, when the edge cache apparatus does not store the content corresponding to the content identifier, after adding a content miss identifier to the content request message, the edge cache apparatus forwards, to the core cache apparatus, a content request message to which the content miss identifier is added. There are multiple methods for adding the content miss identifier. Specifically, for example, a TOS field in an IP header of the content request message may be used as the identifier. When the content request message is missed, the edge cache apparatus sets one bit in the TOS field to 0, which is used as the content miss identifier. Certainly, in practical application, the content miss identifier may also be added by using another method, which is not limited herein.

The core cache apparatus sends, to the cache control apparatus by using the charging and interception apparatus, a response message that carries the content corresponding to the content identifier. In this way, the charging and interception apparatus may perform charging and interception on the content. The response message further carries the content miss identifier.

The cache control apparatus sends, according to the content miss identifier carried in the response message, the content that is corresponding to the content identifier and in the response message to the edge cache apparatus. The edge cache apparatus stores the content and the content identifier of the content, and further sends the content to the access network device.

Certainly, the above description is merely one embodiment of a method for implementing a process in which the edge cache apparatus sends, after acquiring the content from the core cache apparatus, the content to the access network device when the edge cache apparatus does not store the content corresponding to the content identifier. The scope of the embodiments of the invention are not limited to this described embodiment.

In practical application, when the edge cache apparatus does not store the content corresponding to the content identifier, the edge cache apparatus may also not add the content miss identifier to the content request message, but may directly forwards the content request message to the core cache apparatus. The core cache apparatus sends, to the cache control apparatus by using the charging and interception apparatus, a response message that carries the content corresponding to the content identifier. When the cache control apparatus does not detect existence of a content hit identifier in the response message, the cache control apparatus may send the response message to the access network device by using the edge cache apparatus.

In a practical application, a case may occur in which content corresponding to content identifiers in two content request messages is the same, but the two content identifiers are different. For example, when a content identifier is an Http request, the Http request includes two cases: a static URL (Uniform Resource Locator, uniform resource locator) and a dynamic URL. In a case in which the content identifier is a dynamic URL, even though an edge cache apparatus stores content corresponding to the dynamic URL, a dynamic URL stored in the edge cache apparatus may be different from the dynamic URL in the content request message. Even two static URLs corresponding to same content may be different. When this occurs, the edge cache apparatus may request a core cache apparatus to feed back repeated content, which further causes that the edge cache apparatus repeatedly store the same content, thereby wasting a cache resource. In a practical application, the problem can be resolved by using many methods. The following describes a cache content hit method in an embodiment of the present invention.

Figure 2:
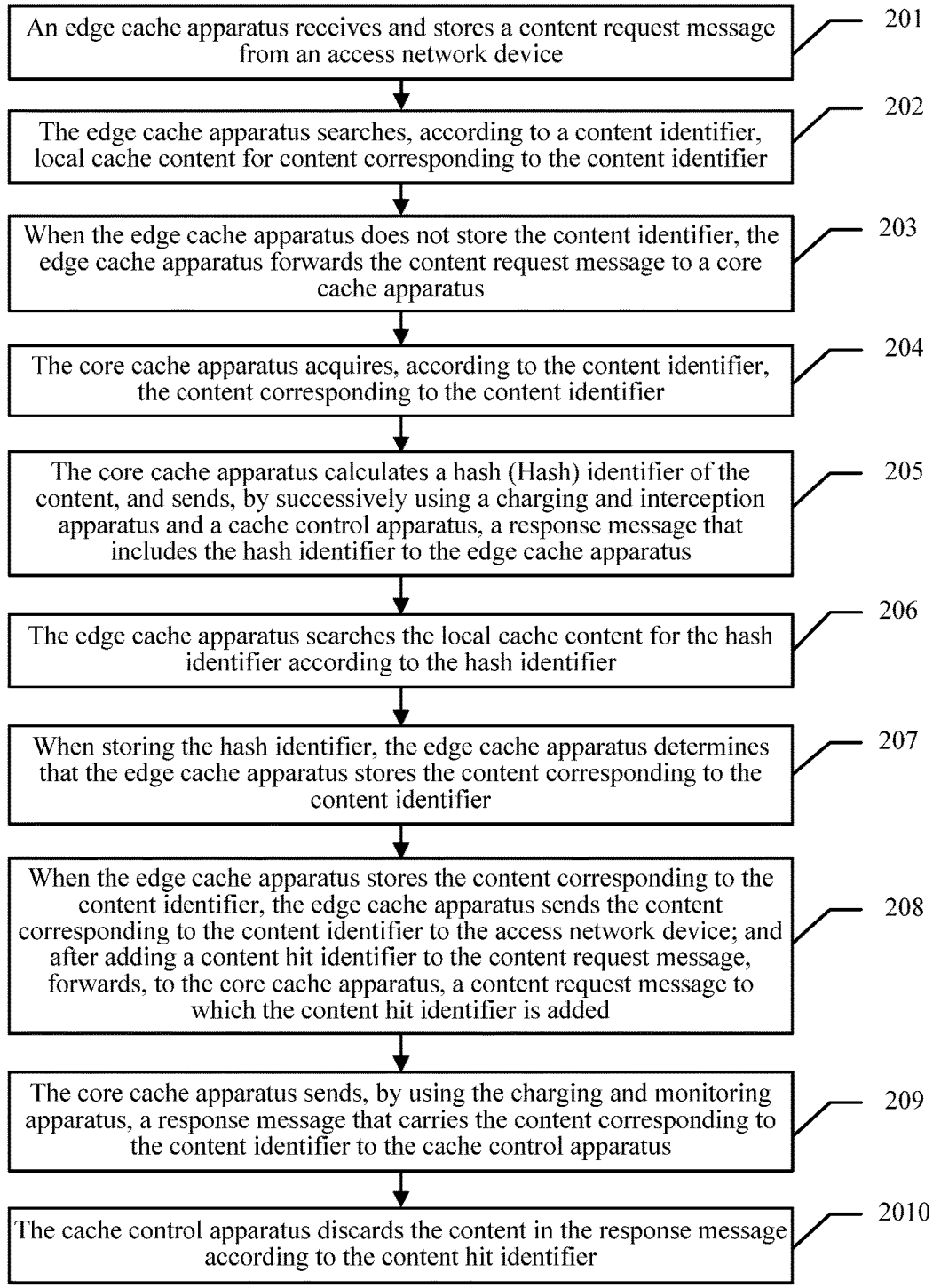
FIG. 2 is a flowchart of another embodiment of a cache content hit method according to the present invention.

Referring to FIG. 2, a cache content hit method in another embodiment of the present invention includes:

201. An edge cache apparatus receives and stores a content request message from an access network device.

For detailed description, reference may be made to the description of step 101 in the embodiment shown in FIG. 1.

202. The edge cache apparatus searches, according to a content identifier, local cache content for content corresponding to the content identifier.

For detailed description, reference may be made to the description of step 102 in the embodiment shown in FIG. 1.

203. When the edge cache apparatus does not store the content identifier, the edge cache apparatus forwards the content request message to a core cache apparatus.

When the edge cache apparatus does not store the content identifier, there are two possible cases. One is that the edge cache apparatus stores the content corresponding to the content identifier, but the content identifier that is corresponding to the content and stored in the edge cache apparatus is different from a content identifier in the received content request message. The other case is that the edge cache apparatus does not store the content corresponding to the content identifier. In order to determine a specific case, the edge cache apparatus forwards the content request message to the core cache apparatus.

204. The core cache apparatus acquires, according to the content identifier, the content corresponding to the content identifier.

After receiving the content request message, the core cache apparatus first searches local cache content for the content identifier, so as to confirm whether the core cache apparatus stores the content corresponding to the content identifier. If the core cache apparatus stores the content corresponding to the content identifier, the core cache apparatus acquires the content. If the core cache apparatus does not store the content corresponding to the content identifier, the core cache apparatus forwards the content request message to the Internet, so as to acquire, from the Internet, the content corresponding to the content identifier.

205. The core cache apparatus calculates a hash (Hash) identifier of the content, and sends, by successively using a charging and interception apparatus and a cache control apparatus, a response message that includes the hash identifier to the edge cache apparatus.

After calculating the hash (Hash) identifier of the content, the core cache apparatus adds the hash identifier to the response message, and forwards, to the edge cache apparatus, a response message to which the hash identifier is added. Because in a communications system, data sent by the core cache apparatus to the edge cache apparatus passes through the charging and interception apparatus and the cache control apparatus, the response message is sent to the edge cache apparatus by successively using the charging and interception apparatus and the cache control apparatus.

206. The edge cache apparatus searches the local cache content for the hash identifier according to the hash identifier.

The edge cache apparatus stores, in the local cache content, previously received hash identifiers of which at least some are from the core cache apparatus and content corresponding to the hash identifiers. When receiving the hash identifier, the edge cache apparatus searches the local cache content for the hash identifier, so as to confirm whether the local cache content stores the content corresponding to the content identifier in the content request message.

207. When the edge cache apparatus stores the hash identifier, the edge cache apparatus determines that the edge cache apparatus stores the content corresponding to the content identifier.

208. When the edge cache apparatus stores the content corresponding to the content identifier, the edge cache apparatus sends the content corresponding to the content identifier to the access network device; and after adding a content hit identifier to the content request message, forwards, to the core cache apparatus, a content request message to which the content hit identifier is added.

For detailed description, reference may be made to the description of step 103 in the embodiment shown in FIG. 1.

209. The core cache apparatus sends, to the cache control apparatus by using the charging and interception apparatus, a response message that carries the content corresponding to the content identifier.

For detailed description, reference may be made to the description of step 104 in the embodiment shown in FIG. 1.

2010. The cache control apparatus discards the content in the response message according to the content hit identifier.

For detailed description, reference may be made to the description of step 105 in the embodiment shown in FIG. 1.

In this embodiment, when an edge cache apparatus does not store a content identifier in a content request message, the edge cache apparatus sends the content request message to a core cache apparatus, so that the core cache apparatus calculates a hash (Hash) identifier of content according to the content corresponding to the content identifier in the content request message. The hash identifier can uniquely identify the content, that is, same content is corresponding to only one hash identifier, which is not the same as that same content may be corresponding to at least two content identifiers. Therefore, a case in which the edge cache apparatus requests the core cache apparatus to feed back repeated content is avoided, where the case is caused because the content is consistent but a content identifier stored in the edge cache apparatus is not consistent with the content identifier in the content request message.

In this embodiment, when receiving and storing a content request message from an access network device, an edge cache apparatus first searches, according to a content identifier, local cache content for content corresponding to the content identifier; and only when the edge cache apparatus does not find the content identifier, forwards the content request message to a core cache apparatus, so that the core cache apparatus calculates a hash identifier of the content and sends the hash identifier to the edge cache apparatus, and then the edge cache apparatus searches the local cache content for the content according to the hash identifier of the content.

In practical application, when receiving and storing the content request message from the access network device, the edge cache apparatus may also not first search the local cache content for the content according to the content identifier, but directly forwards the content request message to the core cache apparatus; and only after the core cache apparatus calculates the hash identifier of the content and sends the hash identifier to the edge cache apparatus, the edge cache apparatus searches the local cache content for the content according to the hash identifier of the content. Each time the edge cache apparatus receives a hash identifier, the edge cache apparatus stores the hash identifier, and associates the hash identifier with content corresponding to the hash identifier, so that the edge cache apparatus can find, according to the hash identifier, the content corresponding to the hash identifier next time.

For ease of understanding, a practical application scenario is used as an example in the following to describe the cache content hit method in this embodiment of the present invention.

When a user terminal needs to access related content of the Internet, an access network device sends a content request message to an edge cache apparatus, where the content request message carries a content identifier. The edge cache apparatus receives and stores the content request message from the access network device, and searches, according to the content identifier, local cache content for content corresponding to the content identifier.

Specifically, when the edge cache apparatus stores the content identifier, the edge cache apparatus determines that the edge cache apparatus stores the content corresponding to the content identifier. If the edge cache apparatus does not find the content identifier in the local cache content, the edge cache apparatus forwards the content request message to a core cache apparatus. The core cache apparatus acquires, according to the content identifier in the content request message, the content corresponding to the content identifier.

Specifically, after receiving the content request message, the core cache apparatus first searches local cache content for the content identifier, so as to confirm whether the core cache apparatus stores the content corresponding to the content identifier. If the core cache apparatus stores the content corresponding to the content identifier, the core cache apparatus sends, to a cache control apparatus, a response message that carries the content corresponding to the content identifier, where the response message further carries a content hit identifier; and when being sent to the cache control apparatus, the response message passes through a charging and interception apparatus.

If the core cache apparatus does not store the content corresponding to the content identifier, the core cache apparatus forwards the content request message to the Internet, so as to request the Internet to feed back the content corresponding to the content identifier in the content request message. After the core cache apparatus receives a feedback from the Internet, the core cache apparatus stores the content identifier in the content request message and the content corresponding to the content identifier.

After calculating a hash (Hash) identifier of the content, the core cache apparatus adds the hash identifier to the response message, and forwards, to the edge cache apparatus, a response message to which the hash identifier is added. Because in a communications system, data sent by the core cache apparatus to the edge cache apparatus passes through the charging and interception apparatus and the cache control apparatus, the response message is sent to the edge cache apparatus by successively using the charging and interception apparatus and the cache control apparatus.

The edge cache apparatus stores, in the local cache content, previously received hash identifiers of which at least some are from the core cache apparatus and content corresponding to the hash identifiers. When receiving the hash identifier, the edge cache apparatus searches the local cache content for the hash identifier, so as to confirm whether the local cache content stores the content corresponding to the content identifier in the content request message. When the edge cache apparatus stores the hash identifier, the edge cache apparatus determines that the edge cache apparatus stores the content corresponding to the content identifier.

After determining that the edge cache apparatus stores the content corresponding to the content identifier, the edge cache apparatus sends the content corresponding to the content identifier to the access network device. In addition, the edge cache apparatus further sets one bit in a TOS field in an IP header of the content request message to 1, which is used as the content hit identifier. The edge cache apparatus forwards to the core cache apparatus the content request message that carries the content hit identifier.

The core cache apparatus sends, to the cache control apparatus by using the charging and interception apparatus, a response message that carries the content corresponding to the content identifier, where the response message further carries the content hit identifier.

When receiving the response message from the core cache apparatus, the charging and interception apparatus performs interception and charging on the content that is corresponding to the content identifier and carried in the response message.

When the response message received by the cache control apparatus carries the content hit identifier, it indicates that the edge cache apparatus has sent the content corresponding to the content identifier in the content request message to the access network device. Therefore, in order to avoid that the access network device repeatedly receives the content corresponding to the content identifier in the content request message, the cache control apparatus discards the content in the response message according to the content hit identifier.

If the edge cache apparatus neither stores the content identifier in the content request message nor stores the hash identifier of the content corresponding to the content identifier, the edge cache apparatus determines that the edge cache apparatus does not store the content corresponding to the content identifier. The edge cache apparatus sets one bit in a TOS field in an IP header of the content request message to 0, which is used as a content miss identifier. The edge cache apparatus sends the content request message to the core cache apparatus.

The core cache apparatus sends, to the cache control apparatus by using the charging and interception apparatus, a response message that carries the content corresponding to the content identifier. In this way, the charging and interception apparatus may perform charging and interception on the content. The response message further carries the content miss identifier.

The cache control apparatus sends, according to the content miss identifier carried in the response message, the content that is corresponding to the content identifier and in the response message to the edge cache apparatus. The edge cache apparatus stores the content and the content identifier of the content, and further sends the content to the access network device.

Figure 3:
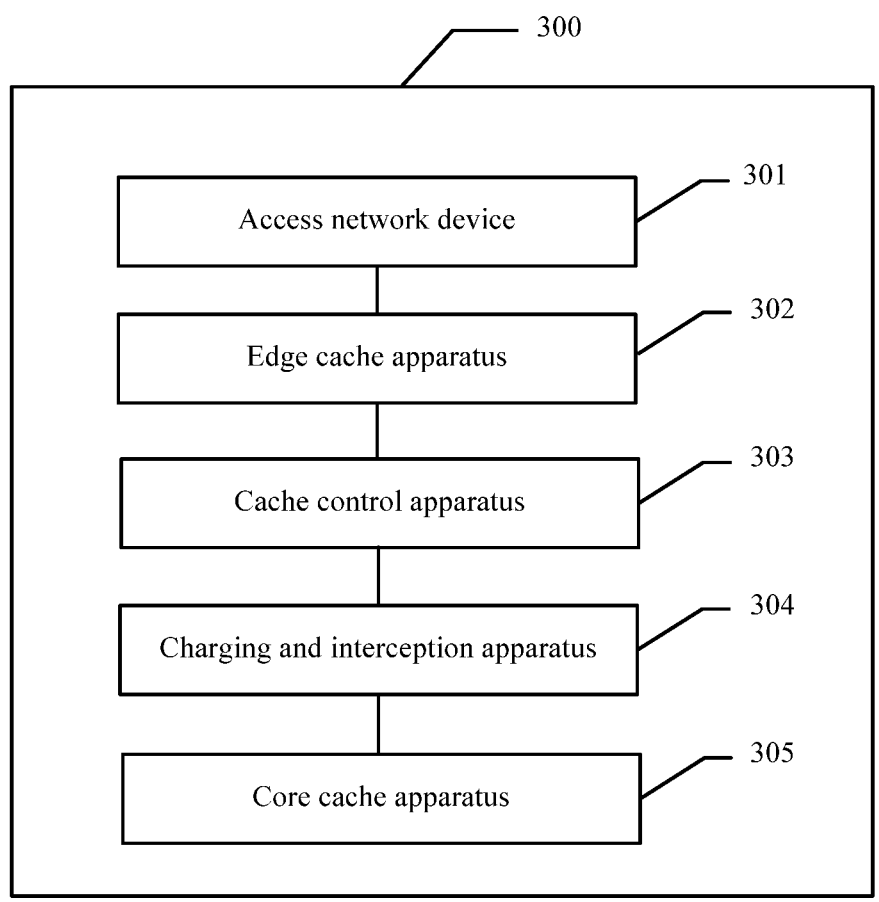
FIG. 3 is a schematic structural diagram of an embodiment of a communications system according to the present invention.

The foregoing describes the cache content hit method in the embodiments of the present invention, and the following describes a communications system in the embodiments of the present invention. Referring to FIG. 3, a communications system 300 in this embodiment of the present invention includes:

an access network device 301, an edge cache apparatus 302, a cache control apparatus 303, a charging and interception apparatus 304, and a core cache apparatus 305.

The edge cache apparatus 302 is configured to receive and store a content request message from the access network device 301, where the content request message carries a content identifier;

the edge cache apparatus 302 is further configured to search local cache content for content corresponding to the content identifier; and the edge cache apparatus 302 is further configured to: when determining that the edge cache apparatus 302 stores the content corresponding to the content identifier, send the content corresponding to the content identifier to the access network device 301; and after adding a content hit identifier to the content request message, forward, to the core cache apparatus 305, a content request message to which the content hit identifier is added.

The core cache apparatus 305 is configured to send, to the cache control apparatus 303 by using the charging and interception apparatus 304, a response message that carries the content corresponding to the content identifier, where the response message carries the content hit identifier.

The cache control apparatus 303 is configured to discard the content in the response message according to the content hit identifier.

In the present invention, when an edge cache apparatus locally stores content corresponding to a content identifier, the edge cache apparatus sends the content corresponding to the content identifier to an access network device; and after adding a content hit identifier to a content request message, further forwards, to a core cache apparatus, a content request message to which the content hit identifier is added. In this way, the core cache apparatus may send, to a cache control apparatus by using a charging and interception apparatus, a response message that carries the content corresponding to the content identifier, so that the charging and interception apparatus can perform interception and charging on the content corresponding to the content identifier. In addition, the edge cache apparatus has fed back the part of related content to a user, and therefore, the cache control apparatus may discard the content in the response message according to the content hit identifier carried in the response message, which avoids repeatedly sending the content to the user. Moreover, in this way, the charging and interception apparatus may not need to discard the content, but the cache control apparatus is added to a communications system to perform the action, which can greatly reduce transformation for an existing apparatus and reduce transformation costs.

Preferably, in this embodiment, the edge cache apparatus is further configured to send, after acquiring the content from the core cache apparatus, the content to the access network device when the edge cache apparatus does not store the content corresponding to the content identifier.

Specifically, for example, the edge cache apparatus is specifically configured to: when the edge cache apparatus does not store the content corresponding to the content identifier, after adding a content miss identifier to the content request message, forward, to the core cache apparatus, a content request message to which the content miss identifier is added. The core cache apparatus is further configured to send, to the cache control apparatus by using the charging and interception apparatus, a response message that carries the content corresponding to the content identifier, where the response message carries the content miss identifier. The cache control apparatus is further configured to send the content to the access network device by using the edge cache apparatus and according to the content miss identifier.

Alternatively, when the edge cache apparatus does not store the content corresponding to the content identifier, the edge cache apparatus may also not add a content miss identifier to the content request message, but directly forwards the content request message to the core cache apparatus. The core cache apparatus sends, to the cache control apparatus by using the charging and interception apparatus, a response message that carries the content corresponding to the content identifier. When the cache control apparatus does not detect existence of a content hit identifier in the response message, the cache control apparatus may send the response message to the access network device by using the edge cache apparatus.

Preferably, in this embodiment, the edge cache apparatus is specifically configured to search, according to the content identifier, the local cache content for the content corresponding to the content identifier; and when the edge cache apparatus stores the content identifier, determine that the edge cache apparatus stores the content corresponding to the content identifier.

In practical application, a case in which content corresponding to content identifiers in two content request messages is the same, but the two content identifiers are different may occur. For example, when a content identifier is an Http request, the Http request includes two cases: a static URL (Uniform Resource Locator, uniform resource locator) and a dynamic URL. In a case in which the content identifier is a dynamic URL, even though an edge cache apparatus stores content corresponding to the dynamic URL, a dynamic URL stored in the edge cache apparatus may be different from the dynamic URL in the content request message. Even two static URLs corresponding to same content may be different. In this way, it causes that the edge cache apparatus may request a core cache apparatus to feed back repeated content, which further causes that the edge cache apparatus repeatedly stores the same content, thereby wasting a cache resource.

Therefore, further, preferably, the edge cache apparatus is further configured to: when the edge cache apparatus does not store the content identifier, forward the content request message to the core cache apparatus.

The core cache apparatus is further configured to acquire, according to the content identifier, the content corresponding to the content identifier, calculate a hash (Hash) identifier of the content, and send a response message that includes the hash identifier to the edge cache apparatus by successively using the charging and interception apparatus and the cache control apparatus.

The edge cache apparatus is further configured to search the local cache content for the hash identifier according to the hash identifier; and when the edge cache apparatus stores the hash identifier, determine that the edge cache apparatus stores the content corresponding to the content identifier.

In this way, The hash identifier can uniquely identify the content, that is, same content is corresponding to only one hash identifier, which is not the same as that same content may be corresponding to at least two content identifiers. Therefore, a case in which the edge cache apparatus requests the core cache apparatus to feed back repeated content is avoided, where the case is caused because the content is consistent but a content identifier stored in the edge cache apparatus is not consistent with the content identifier in the content request message.

In this embodiment, the edge cache apparatus is specifically configured to: when receiving and storing the content request message from the access network device, first search, according to the content identifier, the local cache content for the content corresponding to the content identifier; and only when the edge cache apparatus does not find the content identifier, forward the content request message to the core cache apparatus, so that the core cache apparatus calculates the hash identifier of the content and sends the hash identifier to the edge cache apparatus, and then the edge cache apparatus searches the local cache content for the content according to the hash identifier of the content.

In practical application, when receiving and storing the content request message from the access network device, the edge cache apparatus may also not first search the local cache content for the content according to the content identifier, but directly forwards the content request message to the core cache apparatus; and only after the core cache apparatus calculates the hash identifier of the content and sends the hash identifier to the edge cache apparatus, the edge cache apparatus searches the local cache content for the content according to the hash identifier of the content. Each time the edge cache apparatus receives a hash identifier, the edge cache apparatus stores the hash identifier, and associates the hash identifier with content corresponding to the hash identifier, so that the edge cache apparatus can find, according to the hash identifier, the content corresponding to the hash identifier next time.

For ease of understanding, a practical application scenario is used as an example in the following to describe the communications system in this embodiment of the present invention.

When a user terminal needs to access related content of the Internet, an access network device sends a content request message to an edge cache apparatus, where the content request message carries a content identifier. The edge cache apparatus receives and stores the content request message from the access network device, and searches, according to the content identifier, local cache content for content corresponding to the content identifier.

Specifically, when the edge cache apparatus stores the content identifier, the edge cache apparatus determines that the edge cache apparatus stores the content corresponding to the content identifier. If the edge cache apparatus does not find the content identifier in the local cache content, the edge cache apparatus forwards the content request message to a core cache apparatus. The core cache apparatus acquires, according to the content identifier in the content request message, the content corresponding to the content identifier.

Specifically, after receiving the content request message, the core cache apparatus first searches local cache content for the content identifier, so as to confirm whether the core cache apparatus stores the content corresponding to the content identifier. If the core cache apparatus stores the content corresponding to the content identifier, the core cache apparatus sends, to a cache control apparatus, a response message that carries the content corresponding to the content identifier, where the response message further carries a content hit identifier; and when being sent to the cache control apparatus, the response message passes through a charging and interception apparatus.

If the core cache apparatus does not store the content corresponding to the content identifier, the core cache apparatus forwards the content request message to the Internet, so as to request the Internet to feed back the content corresponding to the content identifier in the content request message. After the core cache apparatus receives a feedback from the Internet, the core cache apparatus stores the content identifier in the content request message and the content corresponding to the content identifier.

After calculating a hash (Hash) identifier of the content, the core cache apparatus adds the hash identifier to the response message, and forwards, to the edge cache apparatus, a response message to which the hash identifier is added. Because in a communications system, data sent by the core cache apparatus to the edge cache apparatus passes through the charging and interception apparatus and the cache control apparatus, the response message is sent to the edge cache apparatus by successively using the charging and interception apparatus and the cache control apparatus.

The edge cache apparatus stores, in the local cache content, previously received hash identifiers of which at least some are from the core cache apparatus and content corresponding to the hash identifiers. When receiving the hash identifier, the edge cache apparatus searches the local cache content for the hash identifier, so as to confirm whether the local cache content stores the content corresponding to the content identifier in the content request message. When the edge cache apparatus stores the hash identifier, the edge cache apparatus determines that the edge cache apparatus stores the content corresponding to the content identifier.

After determining that the edge cache apparatus stores the content corresponding to the content identifier, the edge cache apparatus sends the content corresponding to the content identifier to the access network device. In addition, the edge cache apparatus further sets one bit in a TOS field in an IP header of the content request message to 1, which is used as the content hit identifier. The edge cache apparatus forwards, to the core cache apparatus, the content request message that carries the content hit identifier.

The core cache apparatus sends, to the cache control apparatus by using the charging and interception apparatus, a response message that carries the content corresponding to the content identifier, where the response message further carries the content hit identifier.

When receiving the response message from the core cache apparatus, the charging and interception apparatus performs interception and charging on the content that is corresponding to the content identifier and carried in the response message.

When the response message received by the cache control apparatus carries the content hit identifier, it indicates that the edge cache apparatus has sent the content corresponding to the content identifier in the content request message to the access network device. Therefore, in order to avoid that the access network device repeatedly receives the content corresponding to the content identifier in the content request message, the cache control apparatus discards the content in the response message according to the content hit identifier.

If the edge cache apparatus neither stores the content identifier in the content request message nor stores the hash identifier of the content corresponding to the content identifier, the edge cache apparatus determines that the edge cache apparatus does not store the content corresponding to the content identifier. The edge cache apparatus sets one bit in a TOS field in an IP header of the content request message to 0, which is used as a content miss identifier. The edge cache apparatus sends the content request message to the core cache apparatus.

The core cache apparatus sends, to the cache control apparatus by using the charging and interception apparatus, a response message that carries the content corresponding to the content identifier. In this way, the charging and interception apparatus may perform charging and interception on the content. The response message further carries the content miss identifier.

The cache control apparatus sends, according to the content miss identifier carried in the response message, the content that is corresponding to the content identifier and in the response message to the edge cache apparatus. The edge cache apparatus stores the content and the content identifier of the content, and further sends the content to the access network device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not cause the essence of the technical solutions to depart from the spirit and scope of the technical solutions of the embodiments of the present invention.

What is claimed is:

1. A cache content hit detection method, comprising:
   receiving, by an edge cache apparatus, a content request message from an access network device, wherein the content request message carries a content identifier;
   determining a corresponding content identifier, by the edge cache apparatus that the edge cache apparatus has previously stored content corresponding to the content identifier, and sending the content corresponding content identifier to the access network device;
   forwarding, by the edge cache apparatus to a core cache apparatus after adding a content hit identifier to the content request message, a content request message to which the content hit identifier is added;
   sending, by the core cache apparatus to a cache control apparatus a response message that carries the content corresponding to the content identifier, wherein the response message carries the content hit identifier and wherein the content identifier is used to prompt the cache control apparatus to discard the content in the response message.

2. The cache content hit method according to claim 1 further comprises:
   searching, by the edge cache apparatus based on the content identifier, the local cache content for the content corresponding to the content identifier; and
   when the edge cache apparatus stores the content identifier, determining that the edge cache apparatus stores the content corresponding to the content identifier.

3. The cache content hit method according to claim 1, wherein the determining that the edge cache apparatus stores the content corresponding to the content identifier comprises:
   forwarding, by the edge cache apparatus, the content request message to the core cache apparatus;
   acquiring, by the core cache apparatus according to the content identifier, the content corresponding to the content identifier;
   calculating, by the core cache apparatus, a hash (Hash) identifier of the content, and sending, by successively using the charging and interception apparatus and the cache control apparatus, a response message that comprises the hash identifier to the edge cache apparatus;
   searching, by the edge cache apparatus according to the hash identifier, the local cache content for the content corresponding to the hash identifier; and
   when the edge cache apparatus stores the hash identifier, determining that the edge cache apparatus stores the content corresponding to the content identifier.

4. The cache content hit method according to claim 1, wherein the method further comprises:
   sending, by the edge cache apparatus after acquiring the content from the core cache apparatus, the content to the access network device when the edge cache apparatus does not store the content corresponding to the content identifier.

5. The cache content hit method according to claim 4, wherein the sending, by the edge cache apparatus after acquiring the content from the core cache apparatus, the content to the access network device when the edge cache apparatus does not store the content corresponding to the content identifier comprises:
   when the edge cache apparatus does not store the content corresponding to the content identifier, forwarding, by the edge cache apparatus to the core cache apparatus after adding a content miss identifier to the content request message, a content request message to which the content miss identifier is added;
   sending, by the core cache apparatus to the cache control apparatus by using the charging and interception apparatus, a response message that carries the content corresponding to the content identifier, wherein the response message carries the content miss identifier; and
   sending, by the cache control apparatus, the content to the access network device by using the edge cache apparatus and according to the content miss identifier.

6. The cache content hit method according to claim 4, wherein the sending, by the edge cache apparatus after acquiring the content from the core cache apparatus, the content to the access network device when the edge cache apparatus does not store the content corresponding to the content identifier comprises:
   when the edge cache apparatus does not store the content corresponding to the content identifier, forwarding, by the edge cache apparatus, the content request message to the core cache apparatus;
   sending, by the core cache apparatus to the cache control apparatus by using the charging and interception apparatus, a response message that carries the content corresponding to the content identifier; and
   sending, by the cache control apparatus, the response message to the access network device by using the edge cache apparatus.

7. A communications system, comprising:
   an access network device, an edge cache apparatus, a cache control apparatus, a charging and interception apparatus, and a core cache apparatus, wherein:
   the edge cache apparatus is configured to receive a content request message from the access network device, wherein the content request message carries a content identifier;
   the edge cache apparatus is further configured to search local cache content for content corresponding to the content identifier;
   the edge cache apparatus is further configured to: when determining that the edge cache apparatus stores the content corresponding to the content identifier, send the content corresponding to the content identifier to the access network device; and after adding a content hit identifier to the content request message, forward, to the core cache apparatus, a content request message to which the content hit identifier is added;
   the core cache apparatus is configured to send, to the cache control apparatus by using the charging and interception apparatus, a response message that carries the content corresponding to the content identifier, wherein the response message carries the content hit identifier; and the cache control apparatus is configured to discard the content in the response message according to the content hit identifier.

8. The communications system according to claim 7, wherein the edge cache apparatus is specifically configured to search, according to the content identifier, the local cache content for the content corresponding to the content identifier; and when the edge cache apparatus stores the content identifier, determine that the edge cache apparatus stores the content corresponding to the content identifier.

9. The communications system according to claim 7, wherein:

the edge cache apparatus is further configured to forward the content request message to the core cache apparatus;

the core cache apparatus is further configured to acquire, according to the content identifier, the content corresponding to the content identifier;

the core cache apparatus is further configured to calculate a hash (Hash) identifier of the content, and send, by successively using the charging and interception apparatus and the cache control apparatus, a response message that comprises the hash identifier to the edge cache apparatus;

the edge cache apparatus is further configured to search the local cache content for the hash identifier according to the hash identifier; and the edge cache apparatus is further configured to: when the edge cache apparatus stores the hash identifier, determine that the edge cache apparatus stores the content corresponding to the content identifier.

10. The communications system according to claim 7, wherein the edge cache apparatus is further configured to send, after acquiring the content from the core cache apparatus, the content to the access network device when the edge cache apparatus does not store the content corresponding to the content identifier.

11. The communications system according to claim 10, wherein:

the edge cache apparatus is specifically configured to: when the edge cache apparatus does not store the content corresponding to the content identifier, after adding a content miss identifier to the content request message, forward, to the core cache apparatus, a content request message to which the content miss identifier is added;

the core cache apparatus is further configured to send, to the cache control apparatus by using the charging and interception apparatus, a response message that carries the content corresponding to the content identifier, wherein the response message carries the content miss identifier; and the cache control apparatus is further configured to send the content to the access network device by using the edge cache apparatus and according to the content miss identifier.

12. The communications system according to claim 10, wherein:

the edge cache apparatus is specifically configured to: when the edge cache apparatus does not store the content corresponding to the content identifier, forward the content request message to the core cache apparatus;

the core cache apparatus is specifically configured to send, to the cache control apparatus by using the charging and interception apparatus, a response message that carries the content corresponding to the content identifier; and the cache control apparatus is specifically configured to send the response message to the access network device by using the edge cache apparatus.

* * * * *

UNITED STATES PATENT AND TRADEMARK OFFICE
CERTIFICATE OF CORRECTION

PATENT NO. : 10,306,007 B2
APPLICATION NO. : 15/430055
DATED : May 28, 2019
INVENTOR(S) : Zhang et al.

It is certified that error appears in the above-identified patent and that said Letters Patent is hereby corrected as shown below:

In the Specification

In Column 5, Line 9, delete "In" and insert -- in --, therefor.

In Column 15, Line 64, delete "The hash" and insert -- the hash --, therefor.

In the Claims

In Column 19, in Claim 1, Line 30, after ";" insert -- and --.

In Column 19, in Claim 2, Line 38, after "hit" insert -- detection --.

In Column 19, in Claim 3, Line 46, after "hit" insert -- detection --.

In Column 19, in Claim 4, Line 66, after "hit" insert -- detection --.

In Column 20, in Claim 5, Line 6, after "hit" insert -- detection --.

In Column 20, in Claim 6, Line 28, after "hit" insert -- detection --.

Signed and Sealed this
Thirteenth Day of December, 2022

*Katherine Kelly Vidal*
Katherine Kelly Vidal
*Director of the United States Patent and Trademark Office*